Nov. 10, 1936.  G. A. LYON  2,060,329
TIRE COVER
Filed Nov. 7, 1932   3 Sheets-Sheet 1

Inventor
George Albert Lyon.

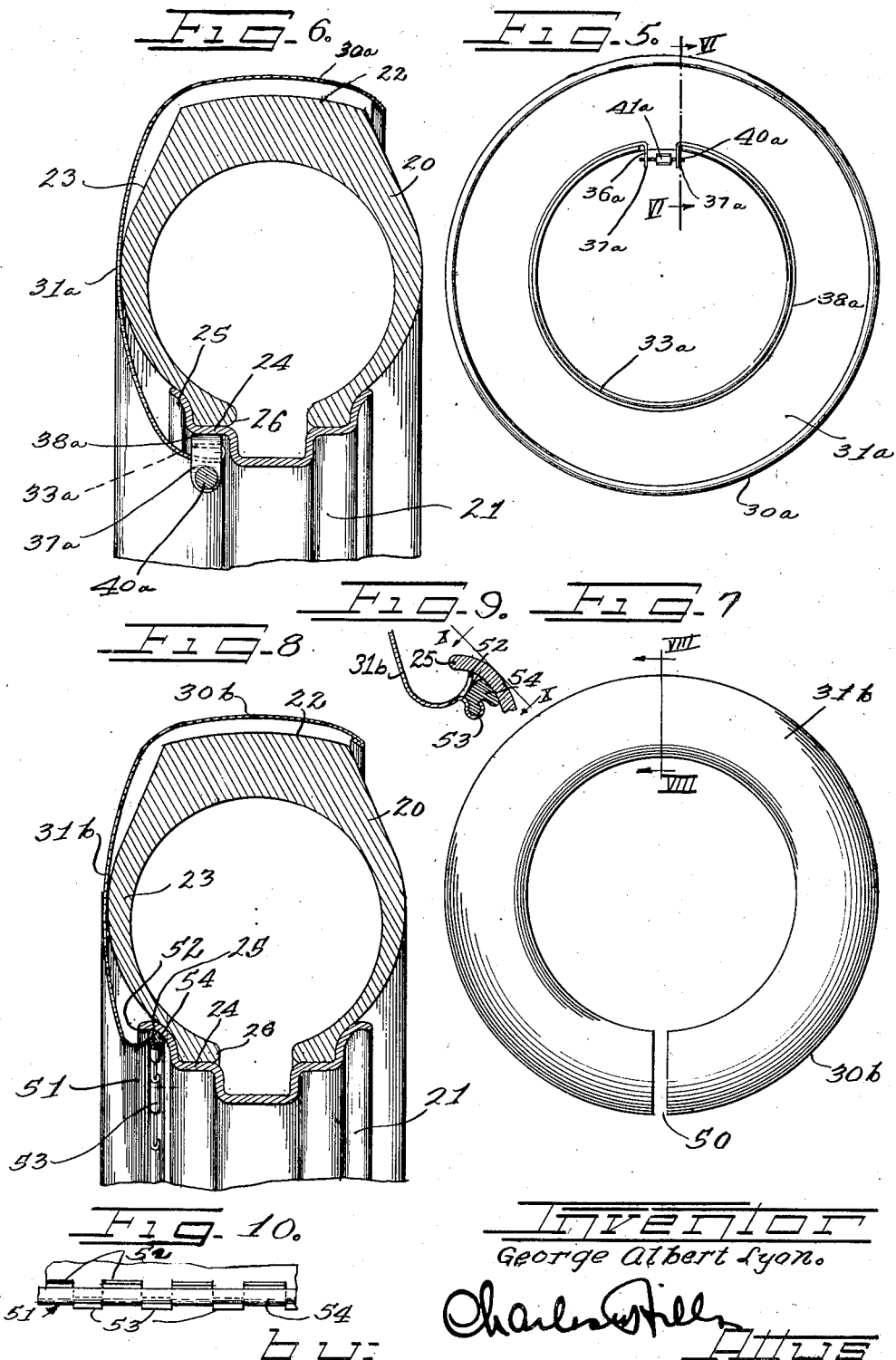

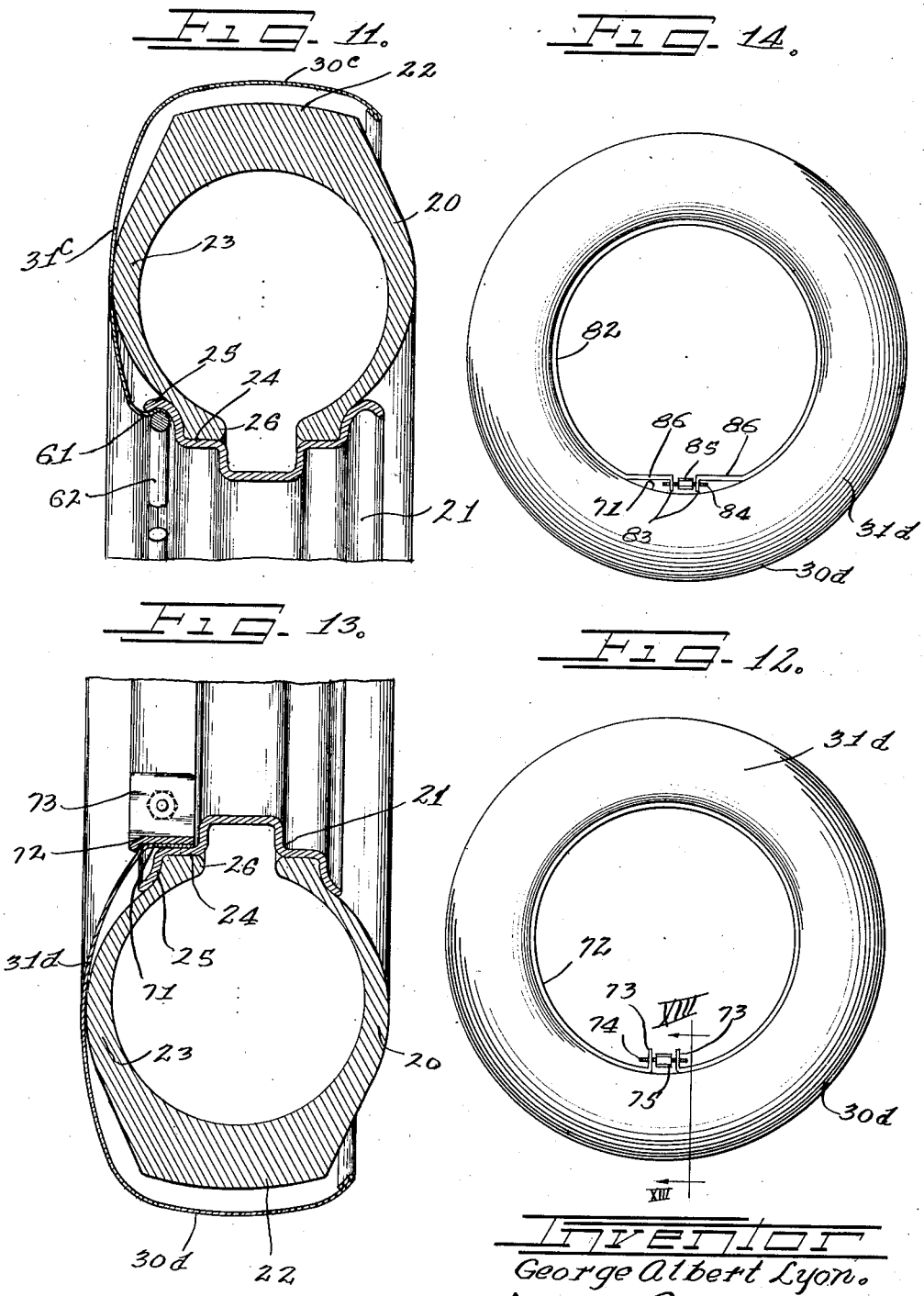

Patented Nov. 10, 1936

2,060,329

UNITED STATES PATENT OFFICE 2,060,329

TIRE COVER

George Albert Lyon, Detroit, Mich., assignor to Lyon Incorporated, Detroit, Mich., a corporation of Delaware Application November 7, 1932, Serial No. 641,495

14 Claims. (Cl. 150—54)

This invention relates to spare tire covers and more particularly to a tire cover held in proper tire protecting position by reason of its cooperation with the rim on which the spare tire is disposed.

An object of this invention is to provide an improved spare tire cover including tread and side wall covering portions which cover is held in proper tire protecting position on the tire by reason of its novel cooperation with the rim on which the spare tire is disposed.

Another object of the invention is to provide a spare tire cover of the above noted type in which the cover is resiliently and detachably held in tight cooperation with a flange of the rim of the spare tire.

A further object of the invention relates to the provision of contractible and expansible means in the form of a ring for cooperation with a flange of the spare tire rim to hold the cover in proper tire protecting position on the tire.

In accordance with the general features of this invention there is provided a spare tire cover including side and tread portions for disposition over the outer side wall and tread respectively of a spare tire, the side portion being provided with contractible and expansible means inwardly of the tire for cooperation with a flange of the rim on which the tire is disposed to retain the cover in proper tire protecting position on the spare tire.

Still another feature of the invention has to do with the provision of contractible and expansible ring means for cooperation with a portion of the cover inwardly of the tire to force said portion into cover retaining engagement with a flange of the rim on which the spare tire is disposed.

It should be noted at this time that by the term "rim" I mean any circular member on which the spare tire is mounted irrespective of whether that rim be in the form of the conventional spare tire rim, wheel rim, or disc rim.

Other objects and features of this invention will more fully appear from the following detail description taken in connection with the accompanying drawings which illustrate several embodiments thereof and in which Figure 1 is a side view of a cover embodying the features of this invention;
Figure 2 is an enlarged fragmentary cross sectional view taken on the line II—II of Figure 1 looking in the direction indicated by the arrows and showing the cover applied to a spare tire;

Figure 5 is a rear elevation of a modified form of cover;

Figure 6 is an enlarged fragmentary sectional view taken on substantially the line VI—VI of Figure 5 looking in the direction indicated by the arrows and showing the cover applied to a spare tire;

Figure 7 is a front view of another form of the invention;

Figure 8 is an enlarged fragmentary sectional view taken on the line VIII—VIII of Figure 7 and showing the cover applied to a spare tire;

Figure 9 is an enlarged fragmentary sectional view of an inner portion of the cover shown in Figure 8 showing the manner in which the cover cooperates with a flange of the spare tire;

Figure 10 is a fragmentary detail view taken on the line X—X of Figure 9 looking in the direction indicated by the arrows;

Figure 11 is a fragmentary sectional view similar to Figure 8 of still a further form of the invention;

Figure 12 is a front elevation of another form of the invention;

Figure 13 is an enlarged fragmentary sectional view taken on substantially the line XIII—XIII of Figure 12 looking in the direction indicated by the arrows and showing the cover applied to a spare tire; and Figure 14 is an elevational view of another form of the invention similar to the view in Figure 12.

As shown on the drawings:

Figure 1:
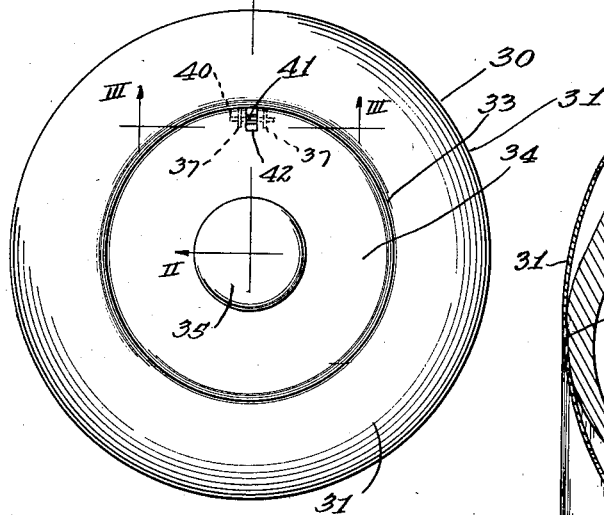
Figure 2:
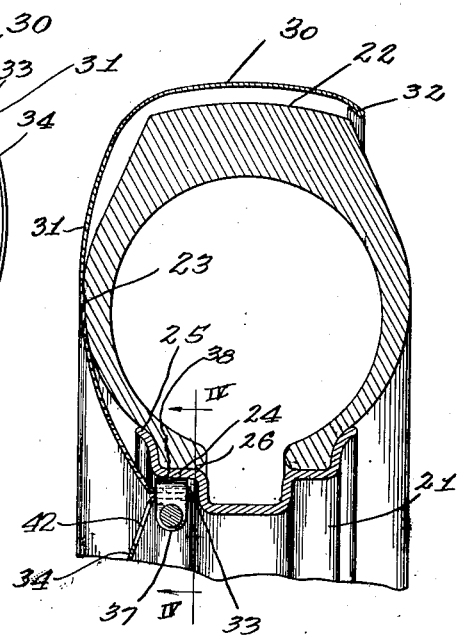
Figure 3:
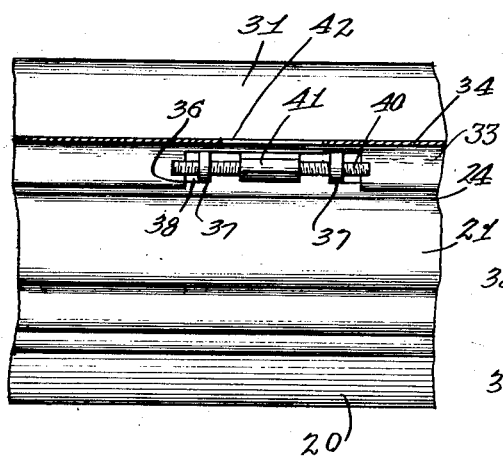
Figure 3 is an enlarged fragmentary detail view partly in section taken on the line III—III of Figure 1 looking upwardly and showing the means for spreading the cover retaining ring.
Figure 4:
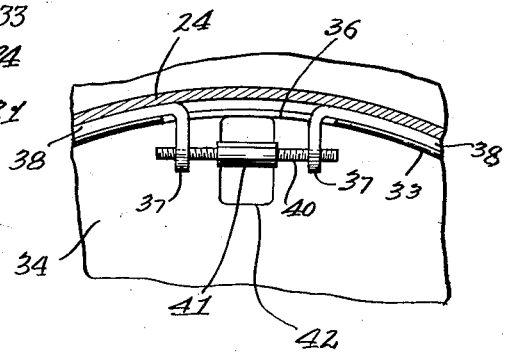
Figure 4 is an enlarged detail sectional view taken on the line IV—IV of Figure 2 looking in the direction indicated by the arrows;

In all of the figures the reference character 20 designates a spare tire disposed in the usual way on a suitable rim designated generally by the reference character 21. The spare tire includes a tread 22 and an outer side wall 23. The rim 21 includes a laterally extending annular flange 24 terminating at its outer extremity in an outwardly extending annular lip 25 which flange and lip engage over a tire bead 26. Inasmuch as the cover is only illustrated as being in cooperation with one side of the flange it is not thought necessary to apply numerals to the other side of the flange but it is to be understood that the other side of the rim could be engaged with cover retaining means in the same manner as the side which is being described.

The first form of the cover illustrated in Figures 1 to 4 inclusive comprises a channeled ring-like member including a tread portion 30 and an outer side wall portion 31 for disposition over the tread 22 and outer side wall 23 of the tire respectively. These portions are of curved convex cross sectional shape so as to conform generally with the contour of the tire. Moreover this cover as well as the other forms of my invention to be described hereinafter in detail may be made from any suitable material such for example as stiff sheet material irrespective of whether the same be metallic sheet, fiberboard sheet or the like. It might be noted however that I have attained excellent results in making my tire covers of steel sheet.

The tread portion 30 of the cover terminates in a turned edge 32 disposed adjacent the rear side of the tread 22.

The outer side wall portion 31 extends inwardly of the tire and terminates in a ring-like flange 33 disposed substantially parallel to the flange 24 of the rim. This flange 33 comprises two layers of material and is made by doubling back the side wall of the cover upon itself. From this flange 33 there extends inwardly a disc-like portion 34 which may terminate at the hub cap part 35 of the spare wheel. This outwardly inclined disc-like portion 34 may have the hub cap 35 integral therewith or may be so formed as to fit around the hub cap 35. The purpose of this disc-like portion 34 is to afford a cover for the center of the spare wheel which is especially desirable where the tire is mounted on a wire spoke wheel. When the cover is put in position on the spare tire and wheel this portion 34 serves to protect the spokes of the wheel from mud, water and the like being splashed thereon.

The flange 33 is provided with a circumferentially extending slot 36 through which projects a pair of inwardly extending spaced ears 37—37 comprising the ends of a split ring 38 which ring 38 is concentric with the flange 33 and is disposed on the outer side of the same. The split ring 38 is secured intermediate its ends to the flange 33 by any suitable means such for example as by welded or riveted connections.

The spaced ears 37—37 are connected by a turn bolt 40 having its ends oppositely threaded into corresponding aligned openings in the ears 37—37 and having its intermediate part provided with a hexagonal portion 41 which is adapted to be manually engaged for the purpose of rotating the turn bolt to spread the ears apart or to draw them together depending upon whether the cover is being applied to or removed from the spare tire. The disc-like portion 34 of the cover is provided with a slot or opening 42 disposed directly opposite the hexagonal nut portion 41 so that access may be had to the same for the purpose of rotating the turn bolt.

Now I have found that provision of the relatively long slot 36 in the annular flange 33 of the cover provides that part of the cover with sufficient resiliency so that it may be slightly expanded for cooperation with the flange 24 in retaining the cover in proper tire protecting position. The expanding of the flange 33 for cover retaining cooperation with the rim flange 24 is effected by spreading the ears 37—37 apart by means of the rotating of the turnbuckle 40. In other words as the ends or ears 37—37 are spread apart the split ring 38 is expanded toward and into retaining engagement with the surface of the rim flange 24 and expands with it to a slight extent the integral cover flange 33. It is through the means of this split band 38 that I am enabled to clampingly and yieldably secure the cover flange 33 to the internal surface of the rim flange 24 whereby the cover may be retained in proper tire protecting position on the tire.

In the operation of applying the cover to the tire it is first shoved axially onto the tire and thereafter the turn bolt 40 is manipulated through the means of the nut 41 so as to spread the ends of the ring 38 whereby the ring and its integral cover flange 33 is brought into retaining cooperation with the rim flange 24.

When it is desired to remove the cover from the tire the same is effected by turning the turn bolt 40 in an opposite direction to that from which it was turned to secure the cover in place whereby the ears 37—37 are drawn toward each other and the split ring 38 is brought out of tight engagement with the rim flange 24. Thereafter the cover may be shoved axially off of the tire.

In the modified form of the invention illustrated in Figures 5 and 6 the ring-like tire cover includes tread and side wall portions 30a and 31a which are similar to the cover portions 30 and 31.

The side portion 31a unlike side portion 31 does not have a ring-like disc portion 34. The side portion 31a however does have a turned back portion or flange 33a provided with a slot 36a through which extend the ears 37a comprising the ends of a ring 38a secured to the outer side of the flange 33a.

The spaced ears 37a—37a are connected by a turnbuckle or turn bolt 40a similar to turn bolt 40 and provided with a hexagonal nut portion 41a.

The application of this cover to and its removal from the tire is substantially the same as the form of the invention previously described. The cover is retained in position on the tire by manipulating the turn bolt 40a to spread the ends of the ring 38a whereby the ring is forced into tight engagement with the flange 24 and inasmuch as the ring 38a has secured to it the turned back flange 33a of the cover it will be appreciated that the securing of the ring to the tire rim 21 also results in the securing of the cover thereto.

It might be noted at this time that in the various forms of my invention which are illustrated in the accompanying drawings the centrally located retaining means cooperating with the rim 21 not only function to retain the cover in proper tire protecting position but also aids in centering the cover on the tire. Moreover the tightening of the retaining means into cooperation with the flange 24 of the rim serves to draw the outer side wall of the cover such as the side walls 31 and 31a previously described into cooperation with the outer side 23 of the tire 20.

In a third form of the invention illustrated in Figures 7 to 10, inclusive, the annular or ring-like cover of channeled cross section is split as indicated at 50 in order to enable the ring to be expanded and contracted. This ring however like the other forms of the invention includes a tread covering portion 30b and a side portion 31b for disposition over the tread and outer side wall respectively of the spare tire 20. The side portion 31b of the cover is provided with an inwardly turned flange-like portion 51 which embodies a plurality of alternate teeth 52 and bead retaining lugs 53 (Figures 9 and 10). The alternate teeth 52 are so formed as to frictionally engage the lip outer surface of the rim lip-like flange 25. The alternate bead retaining lugs 53 are, on the other hand, so formed as to receive and hold a split cushioning ring 54. This split annular bead 54 may be made of any suitable cushioning material such for example as rubber and engages the surface of the rim flange 25 to aid in minimizing rattle between the cover and the rim. In other words, it serves to cushion the frictional connection between the cover and the rim 21.

By splitting the ring-like cover I am enabled to expand and contract this ring with respect to the tire 20. In applying the ring-like cover to the tire 20 it may be slightly expanded and thereafter after it is on the tire the inherent resiliency of it will cause it to contract whereby the alternate or spaced beads 52 are positioned so as to be resiliently and yieldably moved into cover retaining engagement with the exposed surface of the rim flange-like lip 25. At the same time that these teeth engage the flange 25 the cushioning means 54 is also brought into engagement with the flange 25 so as to cushion the connection between the cover and its flange 25.

The modified form of the cover shown in Figure 11 like the other forms embodies tread and side portions 30c and 31c for disposition over the tread 22 and outer side wall 23 respectively of the tire 20.

The side 31c of the cover is provided with an inwardly turned flange-like edge 61 for engagement under the lip-like rim flange 25.

In order to retain this flange 61 in cover retaining cooperation with the rim 21 I provide this form of the invention with a split ring 62 which may be made of any suitable resilient material such for example as steel. In applying this ring it is first contracted and it is then slipped into position inside of the ring-like flange 25 of the rim 21. Thereafter this ring 62 due to its own inherent resiliency expands and forces the cover flange 61 into tight cover retaining engagement with the flange 25 of the rim 21.

A further form of the invention is illustrated in Figures 12 and 13. In this form of the invention the ring-like cover of channel cross section includes tread and side portions 30d and 31d for disposition over the tread 22 and side wall 23 respectively of the tire 20. The side wall portion 31d is provided with an inwardly extending lateral flange 71 which is so disposed as to engage over the rim flange 24.

In order to hold this lateral cover flange 71 in tight cooperation with the rim 21 I provide a split ring 72 having spaced ends in the form of inwardly extending lateral ears 73—73 connected by a turn bolt 74. This turn bolt 74 has its ends threaded in opposite directions as was the case with the previously described turn bolts and is provided with an intermediate hexagonal nut portion 75 adapted to be engaged by a wrench.

Now it will be evident that after this form of cover is on the tire 20 the split ring 72 is inserted in position inside of the cover flange 71 and thereafter the turn bolt 74 is rotated by means of a wrench disposed in engagement with the nut portion 75 whereby the ring is expanded to force the cover flange 71 into tight engagement with the rim flange 24. The removal of the cover is effected by manipulating the turn bolt 74 to draw the ends of the split ring 72 toward each other.

In the last form of the invention shown in Figure 14 the cover is exactly the same as the form shown in Figures 12 and 13 but a slightly modified form of retaining ring is used for cooperation with the cover flange 71. The split ring in this form of the invention is designated by the reference numeral 82 and has spaced lateral ears 83—83 connected by a turn bolt 84 having a hexagonal nut portion 85 adapted for engagement by a wrench. The principal difference between this form of the invention and that shown in Figures 12 and 13 resides in the fact that the ends of the split ring 82 are offset inwardly as indicated at 86—86 and the ears 83—83 are extended outwardly therefrom rather than inwardly of the ring as is the case with the previously described form of the invention. With the exceptions noted this form of the invention is applied to and removed from the spare tire in substantially the same way as is the case with the previously described form of the invention.

I desire it understood that while I have illustrated and described in detail a number of different forms of my invention the invention is not to be thus limited but only in so far as defined by the scope and spirit of the appended claims.

I claim as my invention:

1. In a cover for a spare tire disposed on a rim, side and tread portions for disposition over an outer side wall and tread respectively of the tire and means for expanding and contracting said side portion into and out of cover retaining engagement with said rim.

2. In a cover for a spare tire disposed on a rim, side and tread portions for disposition over an outer side wall and tread respectively of the tire and means for expanding and contracting said side portion into and out of cover retaining engagement with said rim, including a split band connected to the side portion adjacent said rim and having its ends connected by means for expanding and contracting it.

3. In a cover for a spare tire disposed on a rim, side and tread portions for disposition over an outer side wall and tread respectively of the tire and means for expanding and contracting said side portion into and out of cover retaining engagement with said rim, said side portion having an inwardly extending flange for overlying an inner surface of said rim and to which said means is connected for moving said flange into and out of cover retaining engagement with said rim.

4. In a cover for a spare tire disposed on a rim and including a side portion for disposition over an outer side wall of the tire, means for yieldably forcing a part of said side portion into cover retaining engagement with an inner surface of said rim.

5. In a cover for a spare tire disposed on a rim and including a side portion for disposition over an outer side wall of the tire, means for yieldably forcing a part of said side portion into cover retaining engagement with an inner surface of said rim, said means including an expansible and contractible band concentric with said part of the side portion for actuating it into and out of cover retaining engagement with said rim surface.

6. As an article of manufacture, a spare tire cover including side and rim portions for disposition over the outer side wall and tread respectively of the tire, and yieldable means connected to said side portion so as to be removable as a unit therewith and extending inwardly of the tire for cover retaining engagement with a flange of the spare tire rim.

7. As an article of manufacture, a spare tire cover including side and rim portions for disposition over the outer side wall and tread respectively of the tire, and expansible and contractible means connected to said side portion so as to be removable as a unit therewith and extending inwardly of the tire for cover retaining cooperation with a flange of the spare tire rim and formed to hold said side portion in tight engagement with the tire.

8. As an article of manufacture, a spare tire cover including side and rim portions for disposition over the outer side wall and tread respectively of the tire, and yieldable means connected to said side portion and extending inwardly of the tire for cover retaining engagement with a flange of the spare tire rim, said means constituting the sole means for holding the cover in proper tire protecting position on the tire.

9. As an article of manufacture, a spare tire cover comprising a ring-like member of channel cross section so as to fit over the outer periphery and outer side of a spare tire, and means at the inner periphery of the member for yieldable clamping engagement with the rim of the spare tire to center the cover and hold it in proper tire protecting position thereon, said ring-like member being split transversely to enable it to be radially expanded and contracted relative to the tire.

10. As an article of manufacture, a spare tire cover comprising a ring-like member of channel cross section so as to fit over the outer periphery and outer side of a spare tire, and means at the inner periphery of the member for yieldably clamping said periphery against the rim of the spare tire to center the cover and hold it in proper tire protecting position thereon, said ring-like member being split to enable it to be expanded and contracted relative to the tire, said cover holding means including a split expansible and contractible band.

11. In a cover for a spare tire disposed on a rim, an expansible and contractible split ring for disposition axially inwardly of the tire adjacent the rim and constructed and arranged to yieldably clamp a portion of the cover to a flange of the tire rim.

12. In a cover for a spare tire mounted on a rim, side and tread portions for disposition over the outer side wall and tread, respectively, of the tire, said side portion having an inwardly extending flange for overlying an inner surface of the rim, and being constructed and arranged so as to enable said flange to move into and out of cover retaining engagement with the rim, and cushioning means between a part of said flange and the rim.

13. A cover for a spare tire mounted on a tire rim and comprising a single piece of sheet material having a side portion for disposition over the outer side wall of the tire, means associated with said portion and arranged to be disposed adjacent the tire rim and extending inwardly of the tire and formed for cover retaining engagement with a flange of the rim so as to support the cover from the rim without the aid of additional retaining means.

14. As an article of manufacture, a spare tire cover including a circular plate for disposition over an outer side wall of a tire and having an inwardly extending circular portion provided with means having cover retaining engagement with a flange of a rim on which the tire is mounted, said portion having a rubber element for contacting the flange of the tire rim.

GEORGE ALBERT LYON.